US010278479B2

(12) United States Patent
Friedman et al.

(10) Patent No.: US 10,278,479 B2
(45) Date of Patent: May 7, 2019

(54) MIRROR FOR APPLYING EYE COSMETICS

(71) Applicant: MYJF Enterprises, LLC, Dallas, TX (US)

(72) Inventors: Janelle Friedman, Dallas, TX (US); Michael R. Moussa, Euless, TX (US)

(73) Assignee: MYJF Enterprise, LLC, Dallas, TX (US)

( * ) Notice: Subject to any disclaimer, the term of this patent is extended or adjusted under 35 U.S.C. 154(b) by 234 days.

(21) Appl. No.: 15/398,487

(22) Filed: Jan. 4, 2017

(65) Prior Publication Data

US 2017/0112263 A1    Apr. 27, 2017

Related U.S. Application Data

(63) Continuation of application No. 14/843,569, filed on Sep. 2, 2015, now Pat. No. 9,565,921.
(Continued)

(51) Int. Cl.
A45D 42/08 (2006.01)
A45D 42/16 (2006.01)
(Continued)

(52) U.S. Cl.
CPC ............. A45D 42/18 (2013.01); A45D 42/08 (2013.01); A45D 42/16 (2013.01); A47G 1/00 (2013.01);
(Continued)

(58) Field of Classification Search
CPC ...... G02B 17/00; G02B 17/008; A45D 42/00; A45D 42/08; A45D 42/16; A45D 42/18; A45D 42/20; A45D 42/22; A47G 1/16; A47G 1/1606; A47G 1/169773; A47G 1/1646; A47G 1/166; A47G 1/17; A47G 1/00
See application file for complete search history.

(56) References Cited

U.S. PATENT DOCUMENTS 1,859,592 A    5/1932 Marchand
2,140,069 A   12/1938 Bostwick
(Continued)

FOREIGN PATENT DOCUMENTS

EP    2524627 A1   11/2012
JP     574417      10/1993
(Continued)

OTHER PUBLICATIONS

"Spherical Mirrors and Refraction," Boston University Physics Department, 1999, 4 pages. http://physics.bu.edu/py106/notes/Spherical.html.

Primary Examiner — Robert E. Tallman
(74) Attorney, Agent, or Firm — Kirby Drake

(57) ABSTRACT

A magnifying cosmetic mirror for use in applying cosmetics at the eye. The cosmetic mirror is constructed to have a base mirror and side mirrors extending at obtuse angles from opposite sides of the base mirror. The side mirrors are constructed as magnifying mirrors, such as spherical concave mirrors, of a focal length that provides a magnifying view of the eye when placed above the base mirror. The magnification of the side mirrors is selected according to the separation of the side mirrors from one another, and the angles at which they extend from the base mirror.

20 Claims, 13 Drawing Sheets

Related U.S. Application Data

(60) Provisional application No. 62/045,122, filed on Sep. 3, 2014.

(51) Int. Cl.
*A45D 42/18* (2006.01)
*G02B 7/182* (2006.01)
*A47G 1/17* (2006.01)
*A47G 1/16* (2006.01)
*A47G 1/00* (2006.01)
*G02B 5/10* (2006.01)
*A47G 1/04* (2006.01)

(52) U.S. Cl.
CPC ............... *A47G 1/16* (2013.01); *A47G 1/17* (2013.01); *G02B 5/10* (2013.01); *G02B 7/182* (2013.01); *A47G 1/04* (2013.01); *A47G 2001/002* (2013.01)

(56) References Cited

U.S. PATENT DOCUMENTS

| | | | |
|---|---|---|---|
| 2,201,251 A | 5/1940 | Van Patten | |
| 3,620,605 A * | 11/1971 | Clark | G02B 5/08 359/860 |
| 4,119,107 A | 10/1978 | Pinzone et al. | |
| 4,208,105 A | 6/1980 | Hadwiger | |
| 5,516,581 A * | 5/1996 | Kreckel | A47G 1/175 428/317.3 |
| 7,347,573 B1 * | 3/2008 | Isler | A45D 42/10 359/854 |
| 7,418,925 B2 | 9/2008 | Rutherford | |
| 7,942,536 B1 | 5/2011 | Johnson | |
| 8,905,560 B1 | 12/2014 | Zadro | |
| 2004/0090687 A1 | 5/2004 | Samukawa | |
| 2004/0241370 A1 | 12/2004 | Cline et al. | |
| 2005/0270769 A1 * | 12/2005 | Smith | A47G 1/24 362/109 |
| 2007/0090687 A1 | 4/2007 | Young et al. | |
| 2007/0091423 A1 | 4/2007 | Belzunce et al. | |
| 2009/0052072 A1 | 2/2009 | Egosi | |
| 2010/0118422 A1 * | 5/2010 | Holacka | A45D 42/04 359/854 |
| 2010/0128374 A1 | 5/2010 | Zaglin et al. | |

FOREIGN PATENT DOCUMENTS

| | | |
|---|---|---|
| JP | 2002253407 A | 9/2002 |
| JP | 2009219841 A | 10/2009 |

\* cited by examiner

MIRROR FOR APPLYING EYE COSMETICS

CROSS-REFERENCE TO RELATED APPLICATIONS

This Application claims priority to U.S. application Ser. No. 14/843,569 filed Sep. 2, 2015, which claims priority, under 35 U.S.C. § 119(e), to Provisional Application No. 62/045,122, filed Sep. 3, 2014, both incorporated by reference in their entirety.

FIELD OF THE DISCLOSURE

The present disclosure is in the field of mirrors for use in the application of cosmetics to the eyes. Embodiments of the present disclosure are directed to mirrors used to apply mascara, eyeliner, false eyelashes, and other cosmetics at or near the eyes.

BACKGROUND

Many women, and indeed some men, frequently apply cosmetics of various types at or near their eyes. These cosmetics include those commonly referred to as "mascara", which are in the form of a liquid, cake, or cream composition of pigments, oils, waxes, and preservatives for darkening, thickening, lengthening, or visibly defining one's eyelashes. Other types of eye cosmetics include false eyelashes, which may be in the form of individual lashes, eyelash extensions, or full sets of lashes, and which are attached to one's eyelashes or eyelids by way of an adhesive. Eye liner and eye shadow are other types of eye cosmetics applied to the eyelid.

The application of eye cosmetics of these various types to one's own eyes is necessarily awkward. It is easier to apply these cosmetics, particularly false eyelashes, to a closed eye—but of course the eyes must be open in order to accurately place the cosmetics. Precise application of eye cosmetics to one's own eyes, especially with the precision required to attach individual false eyelashes, is thus difficult if not impossible using a conventional plane mirror.

SUMMARY

Embodiments of the present disclosure provide a mirror arrangement that enables a person to view both the top and bottom of her eyelids and eyelashes, to assist in the application of eye cosmetics.

Embodiments of the present disclosure provide such a mirror arrangement that provides significant magnification of the view of the eyelids.

Other advantages and benefits of embodiments of the present disclosure will be apparent to those of ordinary skill in the art having reference to this specification.

Embodiments of the present disclosure may be implemented in a mirror apparatus having a base mirror and first and second side mirrors attached to the base mirror so as to be positioned at an obtuse angle relative to the base mirror. The side mirrors have a magnification selected according to a width of the base mirror and to the obtuse angles.

BRIEF DESCRIPTION OF THE DRAWINGS

FIG. 4b is a side perspective view of the compact mirror of FIG. 4a.

DETAILED DESCRIPTION

The one or more embodiments described in this specification are implemented into a mirror for use in the application of eye cosmetics such as mascara, eyeliner, false eyelashes, and the like, as it is contemplated that such implementation is particularly advantageous in that context. However, it is also contemplated that concepts of the present disclosure may be beneficially applied to other uses, for example in the application of other cosmetics. Accordingly, it is to be understood that the following description is provided by way of example only, and is not intended to limit the true scope of the present disclosure as claimed.

Figure 1A:
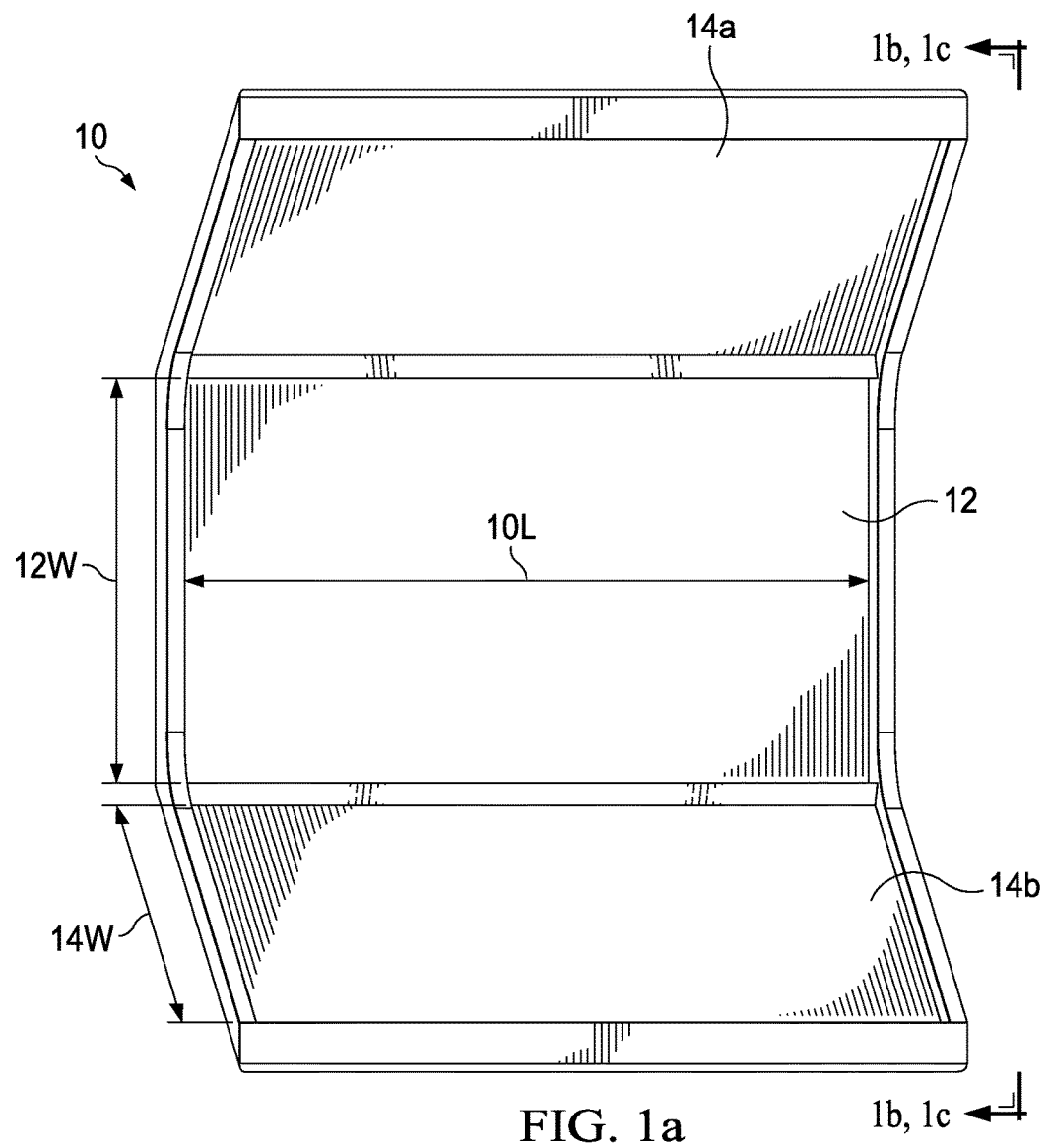
FIG. 1a is a perspective view of a cosmetic mirror according to an embodiment of the present disclosure.
Figure 1B:
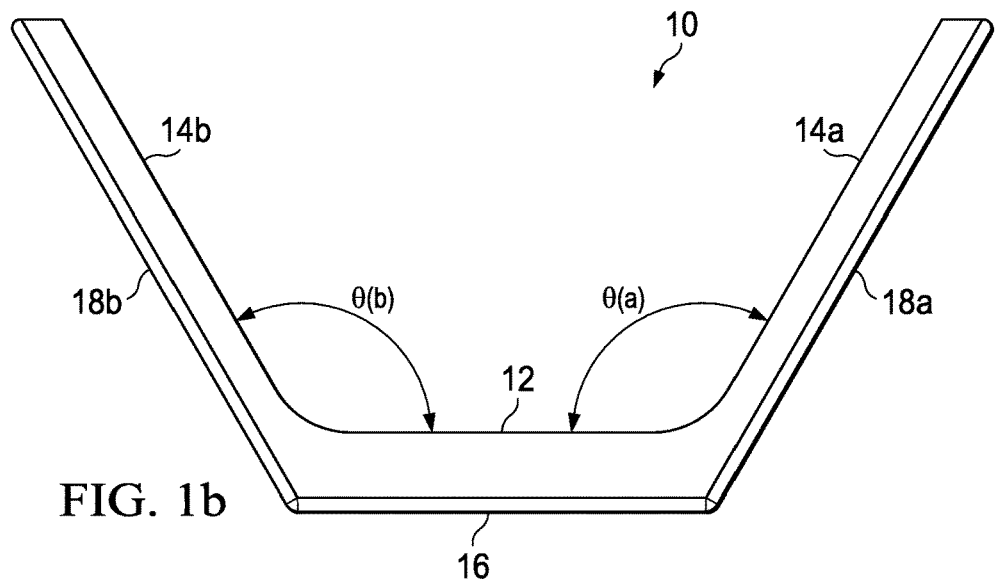
FIG. 1b is a side elevation view of the cosmetic mirror of FIG. 1a according to that embodiment.

FIGS. 1a through 1d illustrate cosmetic mirror 10 according to an embodiment of the present disclosure. As shown in FIGS. 1a and 1b, cosmetic mirror 10 includes base mirror 12 at a surface of base panel 16, and two side mirrors 14a, 14b at a surface of respective side panels 18a, 18b. Base panel 16 and side panels 18a, 18b may be constructed of hard plastic, metal, or another relatively stiff material. Side panels 18a, 18b are attached to opposing edges (typically parallel to one another) of base panel 16. In this embodiment, side panels 18a, 18b are affixed to the edges of the longer sides of base panel 16 as shown in FIGS. 1a through 1d.

Mirrors 12, 14a, 14b may be conventional glass or plastic mirrors attached to base panel 16 and side panels 18a, 18b, respectively, or alternatively may be mirrored surfaces of their respective panels 16, 18a, 18b. According to this embodiment, in which cosmetic mirror 10 assists the application of cosmetics such as mascara, false eyelashes of the individual and full lash type, eye liner, and the like, mirrors 12, 14a, 14b are concave mirrors with focal lengths selected so as to magnify the view of the eye when used. As will be described in further detail below, mirrors 14a, 14b are constructed to provide particular magnification properties for an eye placed at a position, relative to cosmetic mirror 10, at which the user may view both the top eyelid and bottom eyelid without moving her head. In addition, base mirror 12 may also be magnifying with the eye at this same location, but may have a different magnification power as compared with that of mirrors 14a, 14b.

According to this example of FIGS. 1a through 1d, base panel 16 has length 10L that is longer than its width 12W; length 10L is effectively the length of the entirety of cosmetic mirror 10, and may be selected as desired for the particular implementation. In one example, length 10L is on the order of about five inches. Width 12W of base panel 16 in this example is on the order of 2¼ inches and defines the distance between side mirrors 14a, 14b. As will be described in further detail below, this width 12W influences or is influenced by the magnification properties of mirrors 14a, 14b. The width 12W of base panel 16 may or may not exactly correspond to the width of base mirror 12, for example if base mirror 12 is a concave mirror as described below. The width 14W of side panels 18 and side mirrors 14 can be selected as desired, so long as that width (along with the angles of side panels 18 from base panel 16) allows the user to place her eye at a suitable location to view both the top and bottom of her eye. In one example, width 14W may range from on the order of about 1 inch to about 3 inches.

As will be evident from this description, cosmetic mirror 10 is constructed in such a manner to assist the user to apply cosmetics at or near her eyes. This feature results from each of side panels 18a, 18b being attached to base panel 16 at, or positionable to, an obtuse angle (i.e., an angle greater than 90°) relative to base panel 16, which in this embodiment positions side mirrors 14a, 14b at an obtuse angle relative to base mirror 12. As will be described below, because base mirror 12 and side mirrors 14a, 14b are magnifying mirrors, such as spherical concave mirrors, these angles correspond to the angles of the tangent lines to those mirrors at their respective vertices, i.e. the angles between those mirrors if constructed as plane mirrors. According to this definition, as shown in FIG. 1b, side mirror 14a is at obtuse angle θ(a) relative to base mirror 12, and side mirror 14b is at obtuse angle θ(b) relative to base mirror 12. It is contemplated that angles θ(a) and θ(b) will typically be equal to one another; alternatively, these angles θ(a) and θ(b) may differ in some implementations. For example, each of angles θ(a) and θ(b) may range from about 110° to about 160°. As will be described in further detail below, these angles θ(a) and θ(b) also influence or are influenced by the magnification properties of mirrors 14a, 14b, as will now be described with reference to FIG. 1c.

According to this embodiment, as mentioned above, side mirrors 14a, 14b are magnifying mirrors. In particular, side mirrors 14a, 14b are each constructed as substantially spherical concave mirrors with a radius of curvature sufficiently large that, in normal use of cosmetic mirror 10, the user's eye will be at a distance from each of side mirrors 14a, 14b that is shorter than the focal length. For purposes of this description, the term "substantially spherical" refers to a surface that is not perfectly spherical but is sufficiently close to being spherical so as to behave similarly to a perfectly spherical surface within the context of these embodiments. Because the user's eye is at a distance from each of side mirrors 14a, 14b shorter than the focal length, the virtual image of the eye in those mirrors will be upright (i.e., not inverted) and magnified.

Figure 1C:
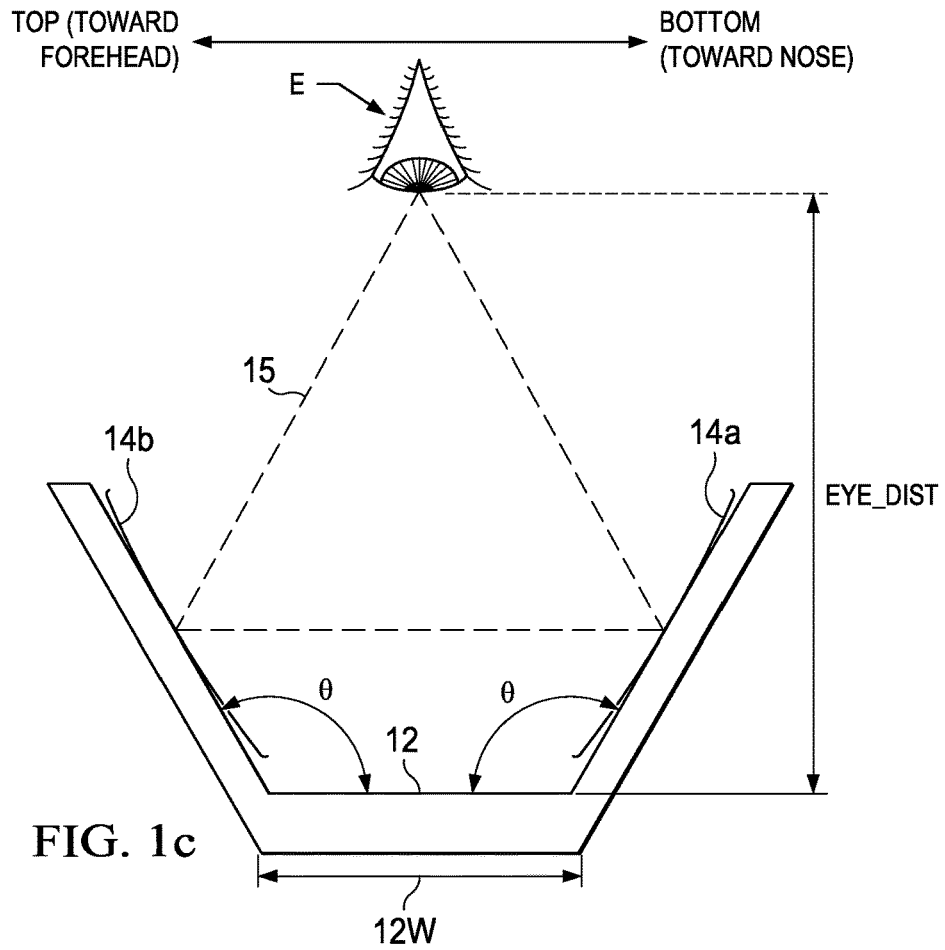
FIG. 1c is a schematic side view of the mirror surfaces of the cosmetic mirror of FIG. 1a according to that embodiment.

As mentioned above, the geometry of cosmetic mirror 10, in particular width 12W of base panel 16 that defines the distance between side mirrors 14a, 14b, and angles θ(a) and θ(b) of side mirrors 14a, 14b relative to base mirror 12, constrains the focal length and thus the magnification of side mirrors 14a, 14b. This interaction among width 12W, radii of curvature of side mirrors 14a, 14b, and angles θ(a) and θ(b) of side mirrors 14a, 14b relative to base mirror 12, can be considered with reference to equilateral triangle 15 shown in FIG. 1c. In the orientation of FIG. 1c, the user is looking downward into cosmetic mirror 10, with side mirror 14a below her eye and side mirror 14b above her eye. If the user places her eye E at or near a vertex of equilateral triangle 15, where one of the sides of equilateral triangle 15 is the horizontal distance between side mirrors 14a, 14b (e.g., at the vertices of these concave mirrors), cosmetic mirror 10 is constructed so that she can see a magnified reflection of her eye from straight ahead in base mirror 12 and, without moving her head but only by directing the focus of her eye E, can see a magnified reflection of the top of her eyelid in the lower-positioned side mirror 14a and a magnified reflection of the bottom of her eyelid in the upper-positioned side mirror 14b. In effect, the user sees the top of her eyelid by focusing downward to side mirror 14a, and sees the bottom of her eyelid by focusing upward to side mirror 14b. But in both cases, the view of her eye is magnified by the curvature of side mirrors 14a, 14b, significantly facilitating the application of eye cosmetics according to this embodiment. The open sides of cosmetic mirror 10, namely the sides at which side mirrors 14a, 14b are not attached, allow access to the eye region by the user so that she can apply the desired cosmetic products.

According to one implementation of cosmetic mirror 10, width 12W is about 2¼ inches and angles θ(a) and θ(b) are equal to each other at θ=120°. In this example, side mirrors 14a, 14b are constructed to have a 5× magnification for an object (i.e., user's eye E) at a distance EYE_DIST of about 4½ inches above the center of base mirror 12 (i.e., the vertex of equilateral triangle 15). At this position, the user can see a magnified view of the top of her eyelid in side mirror 14a and a magnified view of the bottom of her eyelid in side mirror 14b, as well as a magnified straight-on view of her eye in base mirror 12, without moving her head.

Changes in any one of the parameters of width 12W of base panel 16 and angles θ(a) and θ(b) can affect the focal length, and thus the magnification, of side mirrors 14a, 14b. For example, if width 12W is made wider, the focal length of side mirrors 14a, 14b will need to increase (i.e., the radius of curvature will increase) in order to ensure a magnified upright image of the user's eye at the increased distance. Conversely, if the radius of curvature of side mirrors 14a, 14b is reduced in order to increase the magnification, width 12W of base panel 16 will need to decrease, or angles θ(a) and θ(b) will need to decrease, in order for the position of the user's eye E to be closer to side mirrors 14a, 14b and stay in front of the focal point of side mirrors 14a, 14b; this situation may also require shortening of the height of side mirrors 14a, 14b above base mirror 12 to accommodate the user's face at that closer distance. For cosmetic mirror 10 of the dimensions described above, angles θ(a) and θ(b) should range from about 110° to about 130°.

It is contemplated that those skilled in the art having reference to this specification, in particular the relationships among the construction parameters and magnifying side mirrors 14a, 14b described above, will be readily able to construct a particular desired mirror arrangement without undue experimentation.

Base mirror 12 is also preferably a magnifying mirror in this embodiment, for example also constructed as a substantially spherical concave mirror (curvature not shown in FIG. 1c for the sake of clarity). The magnification of base mirror 12 does not affect the interacting magnification and angles θ of side mirrors 14a, 14b, nor does it directly affect width 12W. As such, the magnification of base mirror 12 can be independently selected to provide the desired result. For the example described above in which side mirrors 14a, 14b have a magnification of about 5×, base mirror 12 may have a magnification of about 10× for eye E in the location shown in FIG. 1c.

Figure 1D:
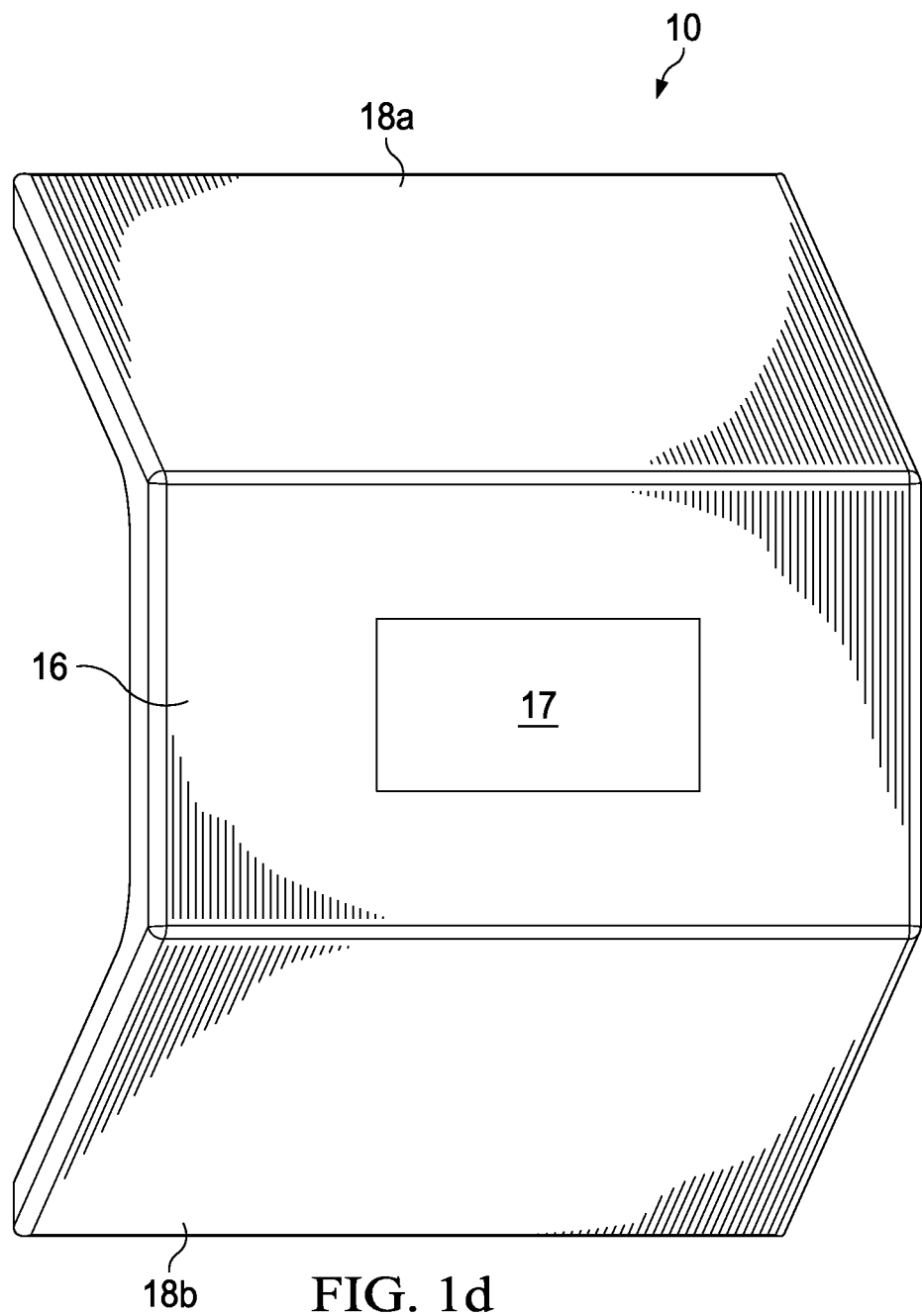
FIG. 1d is a rear view of the cosmetic mirror of FIG. 1a according to an alternative implementation of that embodiment.

FIG. 1d illustrates the back of one implementation of cosmetic mirror 10. In this example, the back side of base panel 16 is provided with optional adhering strip 17 for mounting cosmetic mirror 10 to a vertical surface, such as a bathroom mirror. Adhering strip 17 may be manufactured into base panel 16, or alternatively may be provided as a customer option, for example in the form of a peel-and-stick strip. Further in the alternative, adhering strip 17 may be constructed as a magnetic strip, so that cosmetic mirror 10 may be removably mounted to a vertical surface, or adhering strip 19 may be a double-sided adhesive strip to provide a more permanent mount. A logo may be provided on the back side of base panel 16, for branding purposes.

Figure 2A:
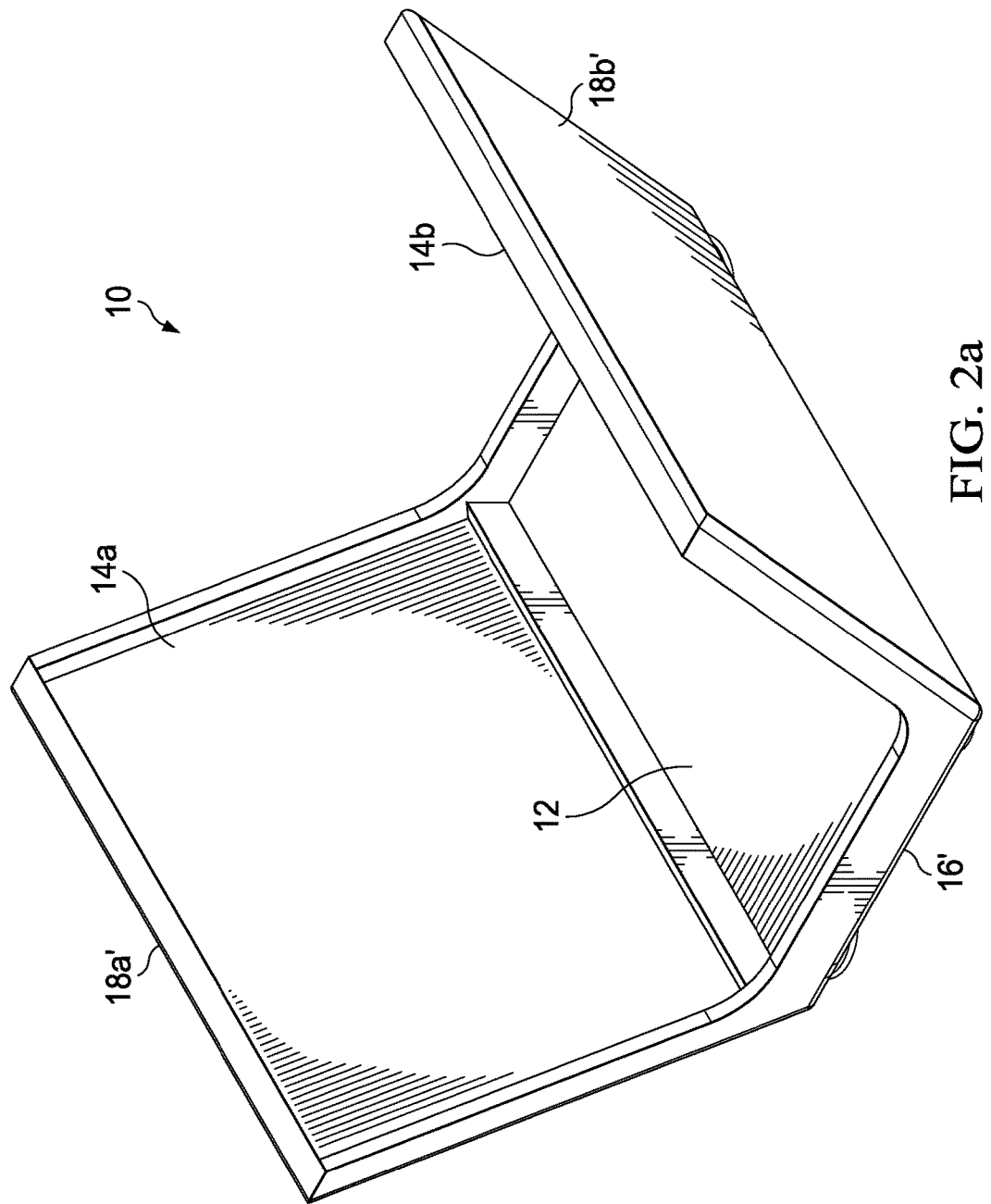
FIGS. 2a and 2b are perspective views of an implementation of a cosmetic mirror according to an embodiment.
Figure 2B:
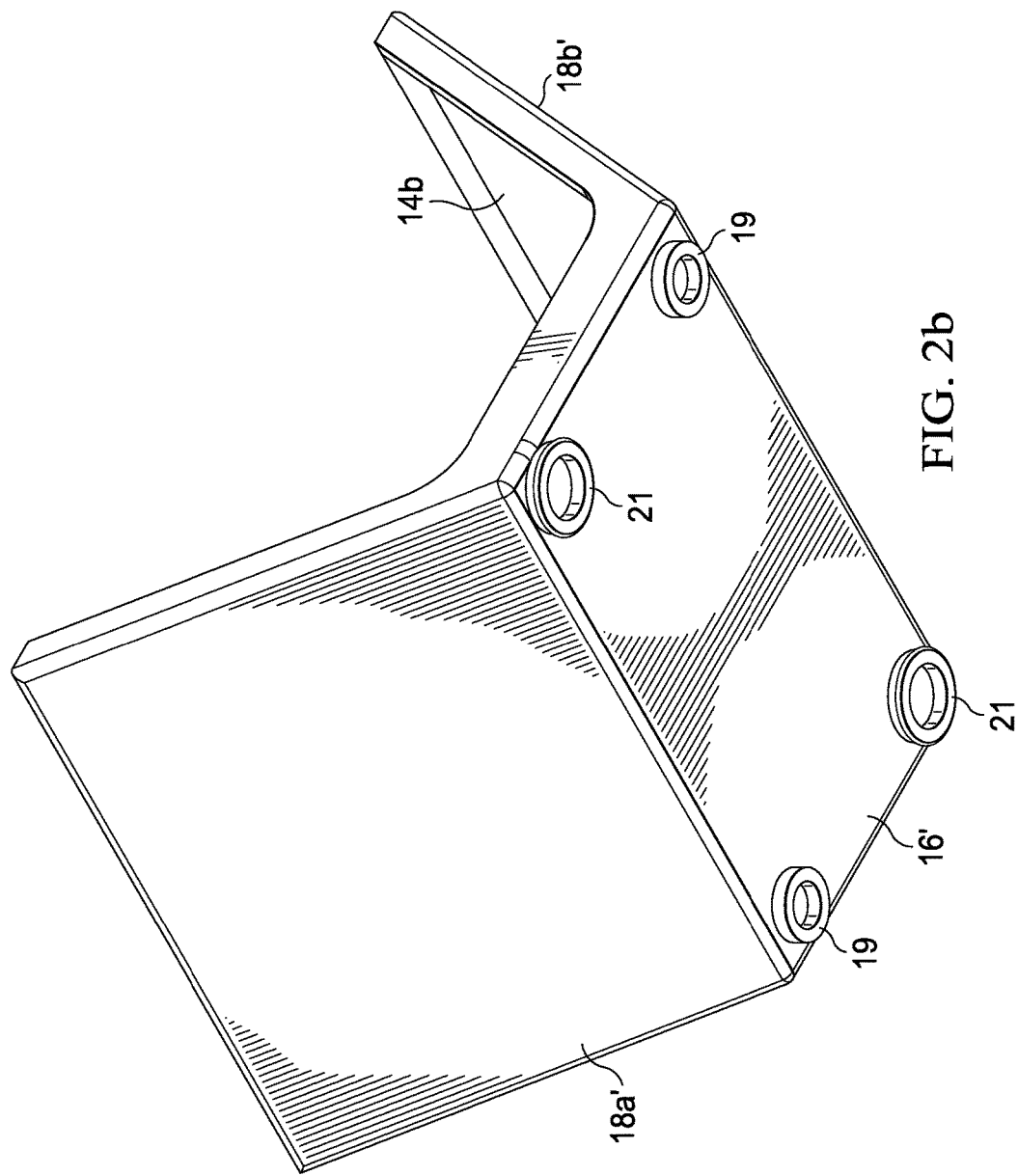

FIGS. 2a through 2f illustrate the arrangement of a cosmetic mirror system including cosmetic mirror 10 as described above in combination with base 20 according to an embodiment. In this embodiment, base 20 also serves as a container for mirror 10 when not in use. FIG. 2a illustrates a particular implementation of cosmetic mirror 10 of FIGS. 1a through 1d, in which base panel 16' has short wall portions that enclose base mirror 12, and in which side panels 18a', 18b' similarly have short wall portions that enclose side mirrors 14a, 14b, respectively. In this arrangement, as shown in the bottom perspective of FIG. 2b, diagonally opposite corners of the underside of base panel 16' are each provided with a circular foot 19 of a selected diameter, and the other diagonally opposite corners of the underside of base panel 16' are each provided with a circular foot 21 of a larger diameter than that of feet 19. For example, if base panel 16' is constructed of molded plastic, feet 19, 21 may be formed as molded protrusions of the molded body forming base panel 16'. It is contemplated that base panel 16' and side panels 18a', 18b' may be molded as a unitary whole; alternatively, these elements may be separately molded and then attached to one another when assembled. In this example shown in FIG. 2b, feet 19, 21 are in the shape of a torus; the particular size and shape of feet 19, 21 will correspond to the construction of base 20, as will now be described with reference to FIGS. 2c and 2d.

Figure 2C:
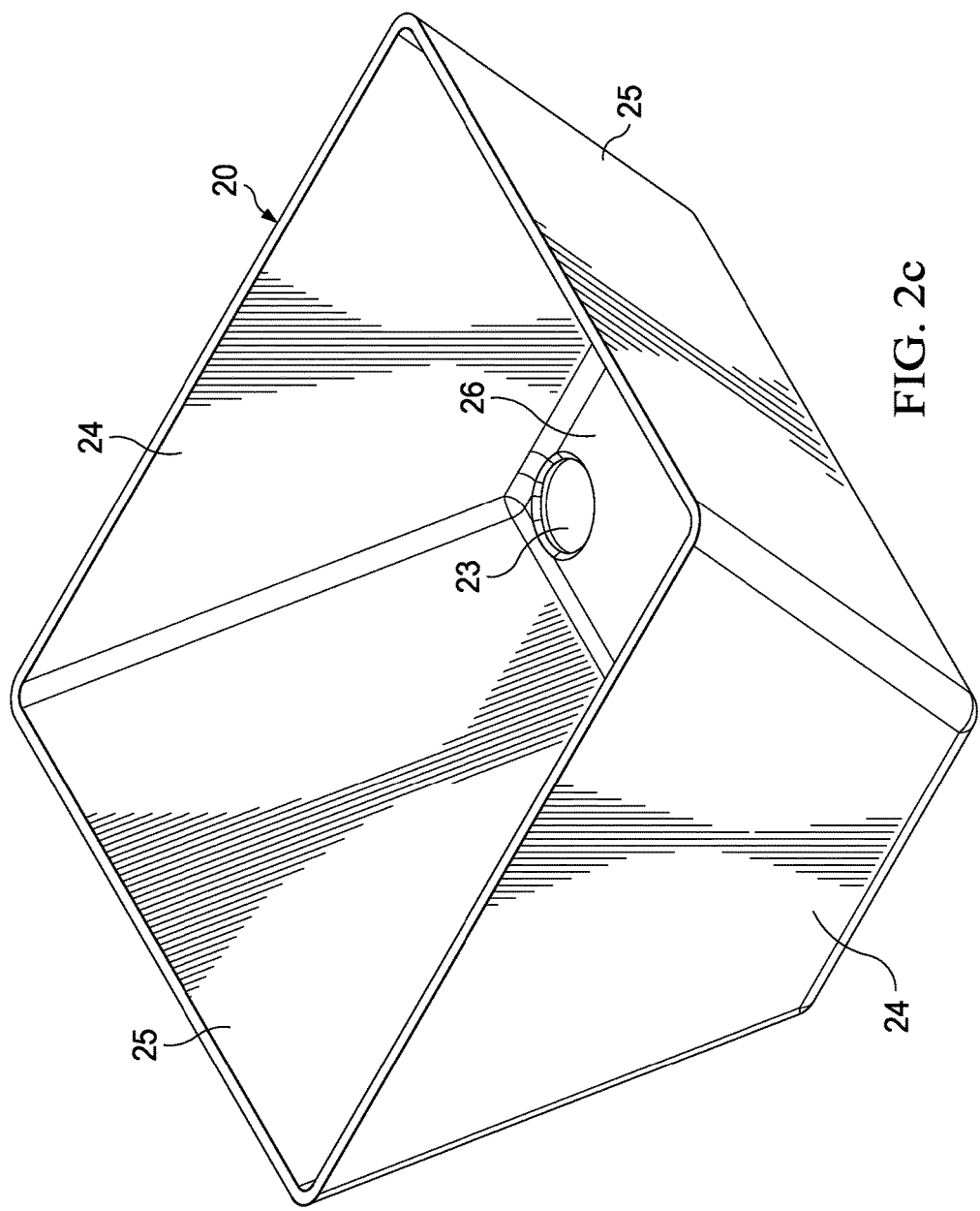
FIGS. 2c and 2d are perspective views of a dual purpose case and base for the cosmetic mirror of FIGS. 3a and 2b.
Figure 2D:
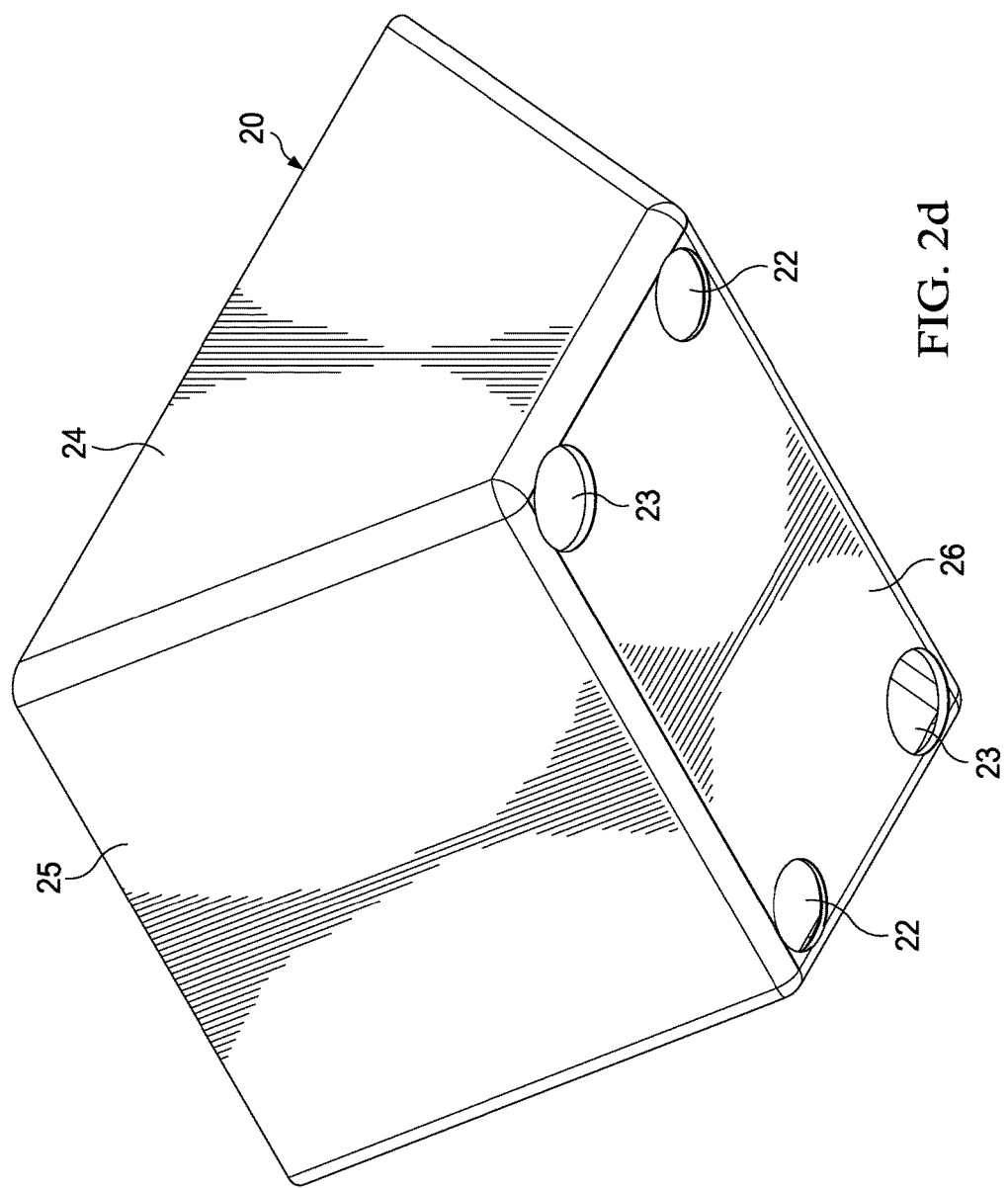

Base 20 of FIG. 2c is formed as an open-top container, with rectangular base panel 26, two trapezoidal side panels 24, and two rectangular side panels 25. Trapezoidal side panels 24 each have their shorter parallel side attached to a side of base panel 26, so that they extend substantially perpendicularly from opposing sides of base panel 26. Rectangular side panels 25 have one side attached to a side of base panel 26 so as to oppose one another, and to extend away from base panel 26 at the angles defined by the non-parallel sides of trapezoidal side panels 24. The adjacent sides of panels 25, 26 are attached to one another. Base 20 may be constructed of molded plastic, in which case base panel 26 and side panels 24, 25 may be molded into base 20 as a unitary whole; alternatively, these elements may be separately molded and then attached to one another when assembled. According to this embodiment, base panel 26 has an instance of hole 22 at diagonally opposing corners, while the other pair of diagonally opposing corners of base panel 26 has an instance of larger-diameter hole 23. Holes 22 are formed to have a size and a shape corresponding to the size and shape of feet 19 at base panel 16' of cosmetic mirror 10, and holes 23 are formed to have a size and shape corresponding to the size and shape of feet 21 at base panel 16'.

In this example, holes 22, 23 in base panel 26 of base 20 are circular, of a size suitable to snugly accept corresponding feet 19, 21, respectively, of base panel 16' if oriented accordingly. For example, the size of holes 22, 23 may closely match the outer diameter of feet 19, 21, respectively. With this close correspondence in sizes, the torus shape of feet 19, 21 will allow some flexure when inserted into their respective holes 22, 23, resulting in a snap fit. The diagonal orientation of feet 19 of one size relative to feet 21 of another size, in combination with the similar orientation of holes 22, 23, allow for this snap fit of cosmetic mirror 10 into base 20 in one orientation of base 20, but not with base 20 in another orientation, as will now be described.

Figure 2E:
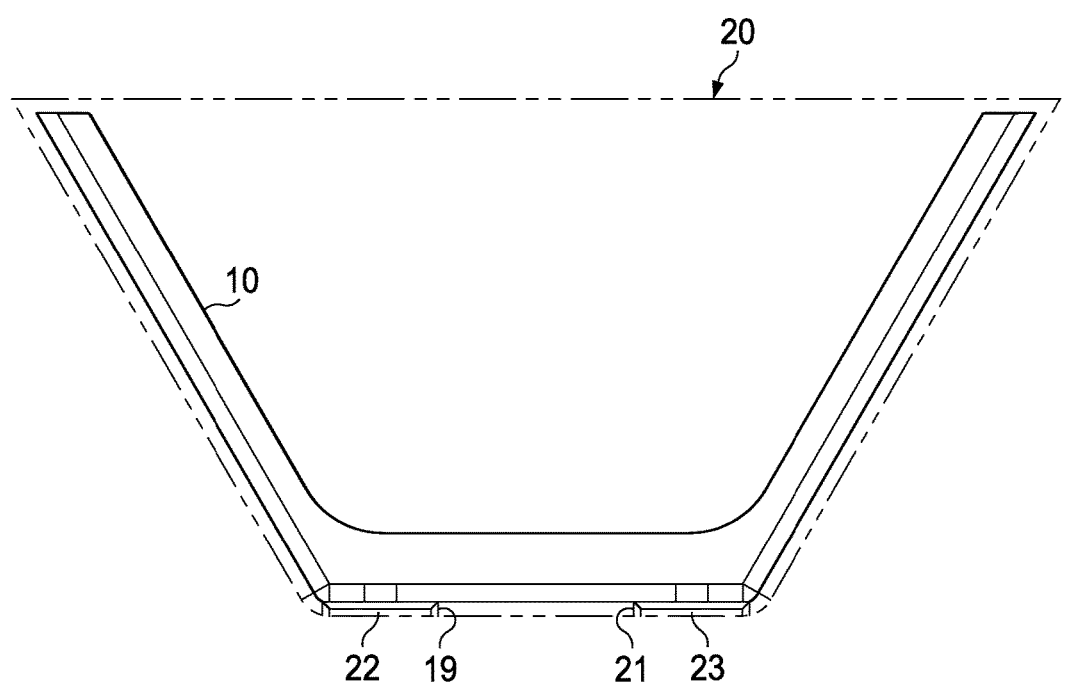
FIGS. 2e and 2f are side elevation views of the cosmetic mirror and base of FIGS. 2a through 2d, illustrating storage and use, respectively, of the mirror according to that embodiment.

Base 20 has a size corresponding to that of cosmetic mirror 10. More specifically, the interior volume of base 20 is sized to accommodate the placement of cosmetic mirror 10 into base 20, with side panels 18a', 18b' of cosmetic mirror 10 along the interior sides of rectangular side panels 25 of base 20. FIG. 2e illustrates, in cross-section, cosmetic mirror 10 placed within base 20. It is desirable that the interior volume of base 20 be only slightly larger than the exterior dimensions of cosmetic mirror 10 for a close but not tight fit, as suggested by FIG. 2e. In this embodiment, the orientation of holes 22, 23 of base panel 26 of base 20 is selected so that larger feet 21 of base panel 16' match up with smaller holes 22 of base panel 26 of base 20 when cosmetic mirror 10 is placed within the interior of base 20, as shown in FIG. 2e. This prevents cosmetic mirror 10 from snapping into place in this orientation, which is contemplated to be convenient for packaging and initial use by a purchaser, while still enabling base 20 to provide secure and protective storage for cosmetic mirror 10 when not in use.

Figure 2F:
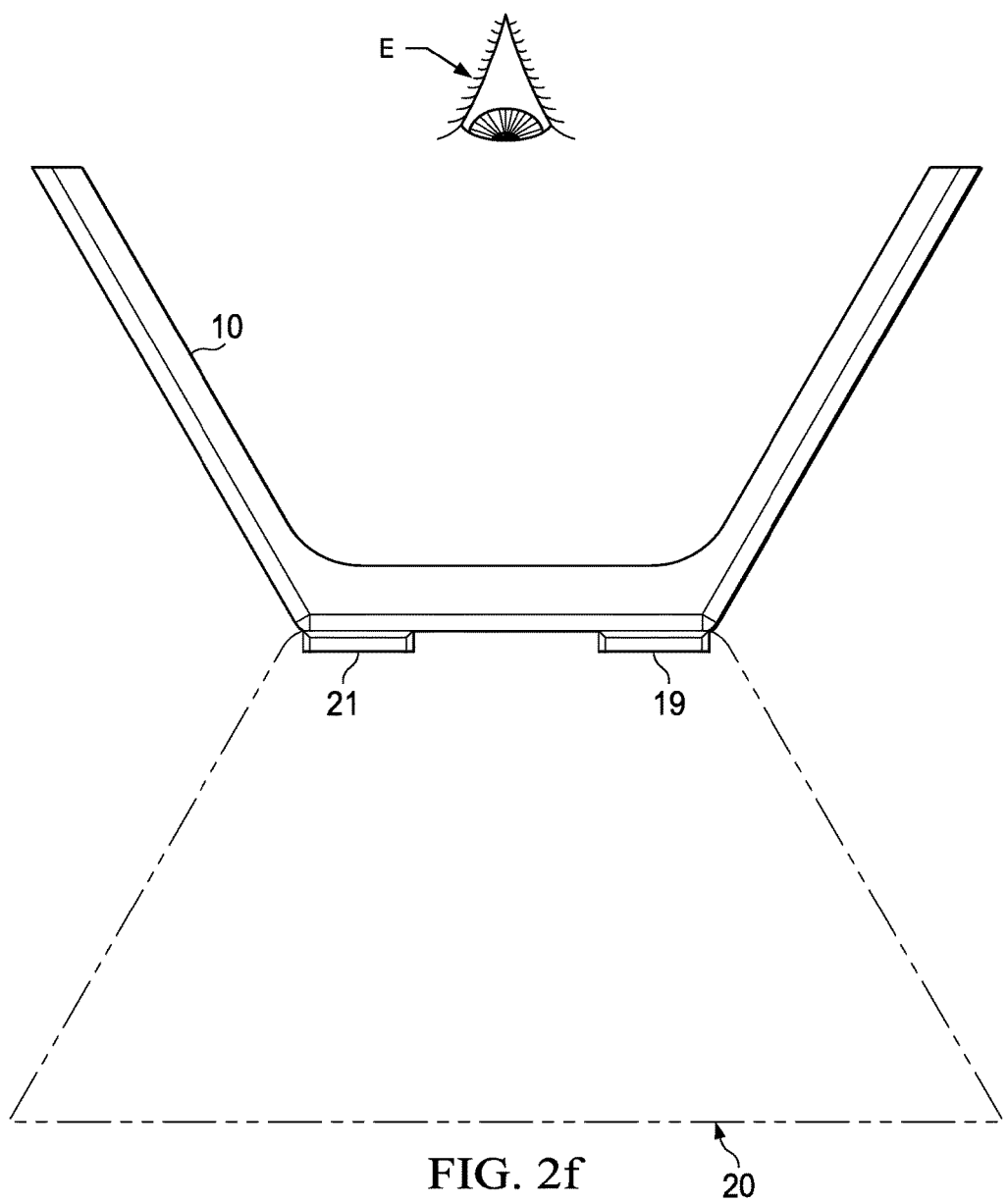

In its opposite orientation according to this embodiment, base 20 serves as a stand for cosmetic mirror 10 when in use, as will now be described relative to FIG. 2f. This is accomplished by removing cosmetic mirror 10 from the interior of base 20, turning base 20 over so as to set its larger open end on a table or vanity surface, and then setting cosmetic mirror 10 onto base panel 26 of the overturned base 20. In this orientation, smaller feet 19 will mate with smaller holes 22 of base panel 26, and larger feet 21 will mate with larger holes 23 of base panel 26, such that feet 19, 21 fit through and snap into holes 22, 23, respectively, as shown in FIG. 2f. Base 20 thus serves as a stand for cosmetic mirror 10, bringing it closer to a comfortable height so that the user can position her eye at the appropriate distance from base mirror 12 and side mirrors 14a, 14b in the manner discussed above, without cosmetic mirror 10 at a risk of sliding off base 20.

Alternatively to the use of cosmetic mirror 10 in the orientation of FIGS. 1c and 2f, in which the user looks down into cosmetic mirror 10, cosmetic mirror 10 may be used in other orientations. For example, if optional adhering strip 17 is applied as shown in FIG. 1d, cosmetic mirror 10 may be mounted to a vertical surface, such as a bathroom mirror, in which case the user would look straight-ahead toward the vertically-oriented base mirror 12. Further in the alternative, cosmetic mirror 10 may simply be handheld in a comfortable orientation for the user to apply the desired eye cosmetics. In each of these cases, it is contemplated that the user will place her eye somewhat close to mirrors 12, 14a, 14b as discussed above relative to FIG. 1c, to obtain the benefit of seeing her top and bottom eyelashes in corresponding side mirrors 14a, 14b, while looking directly into base mirror 12 to see her lashes in direct view.

In each of these arrangements, cosmetic mirror 10 may be reversed in use so that side mirror 14b is at the top of base mirror 12, and side mirror 14a is at the bottom of base mirror 12; if angles $\theta(a)$ and $\theta(b)$ are the same as one another and if the magnification is the same for side mirrors 14a, 14b, no difference in use will result. However, if these angles or magnifications differ, different users may find reversal of the angles to be preferable.

Alternative embodiments are contemplated in which hinges are used to attach the side panels and side mirrors to the base panel and base mirror. An example of these alternative embodiments will now be described relative to FIGS. 3a through 3c.

Figure 3A:
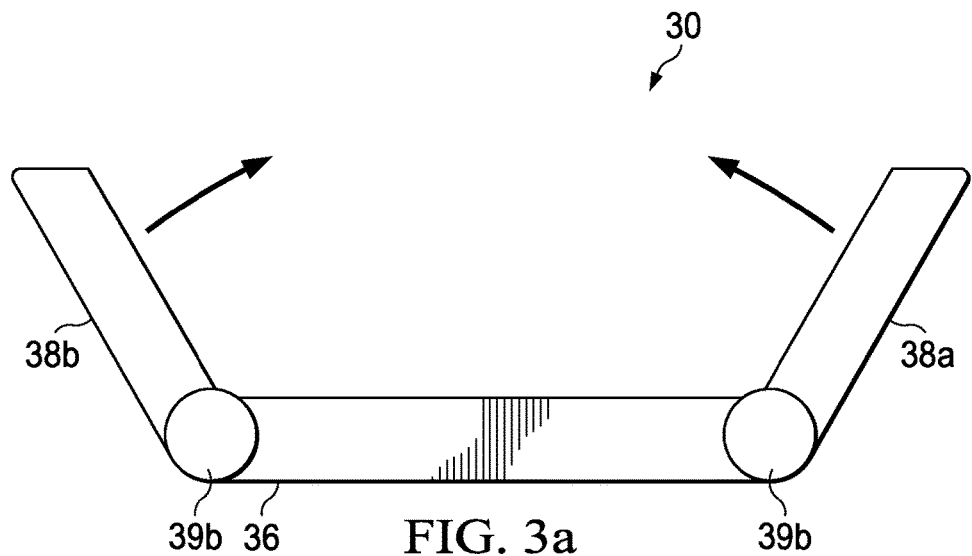
FIGS. 3a and 3b are side and plan views of a collapsible mirror according to an embodiment of the present disclosure.
Figure 3B:
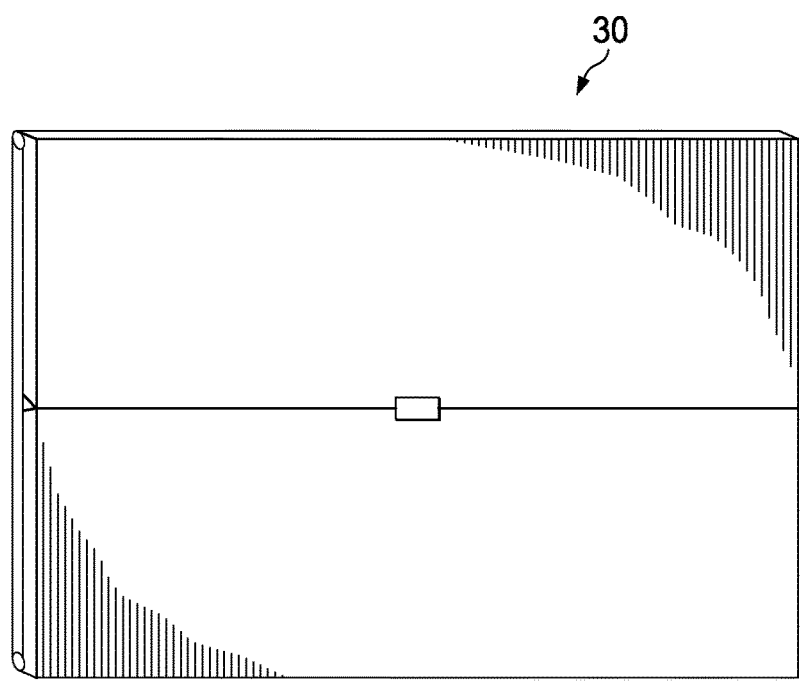

FIG. 3a illustrates a side view of cosmetic mirror 30 according to another embodiment. In this example, cosmetic mirror 30 includes base panel 36 having side panels 38a, 38b are attached at its opposing edges. In this example, side panel 38a is attached to an edge of base panel 36 by way of hinge 39a, and side panel 38b is attached to an edge of base panel 36 by way of hinge 39b. Hinges 39a, 39b fold their respective side panels 38a, 38b inwardly toward base panel 36, for example to allow cosmetic mirror 30 to fold closed. FIG. 3b illustrates cosmetic mirror 30 in a fully closed position (with a logo on the outside of one of side panels 38, for branding purposes).

As shown in FIG. 3a, a gap may be provided between the edges of base panel 36 and side panels 38a, 38b, at hinges 39a, 39b, respectively, to define a maximum angle to which side panels 38a, 38b may be opened. This maximum angle may be the preferred angle for use in the application of mascara, or alternatively hinges 39a, 39b may be constructed to hold the position of side panels 38a, 38b at any angle between closed and this maximum angle, as desired by the user.

Figure 3C:
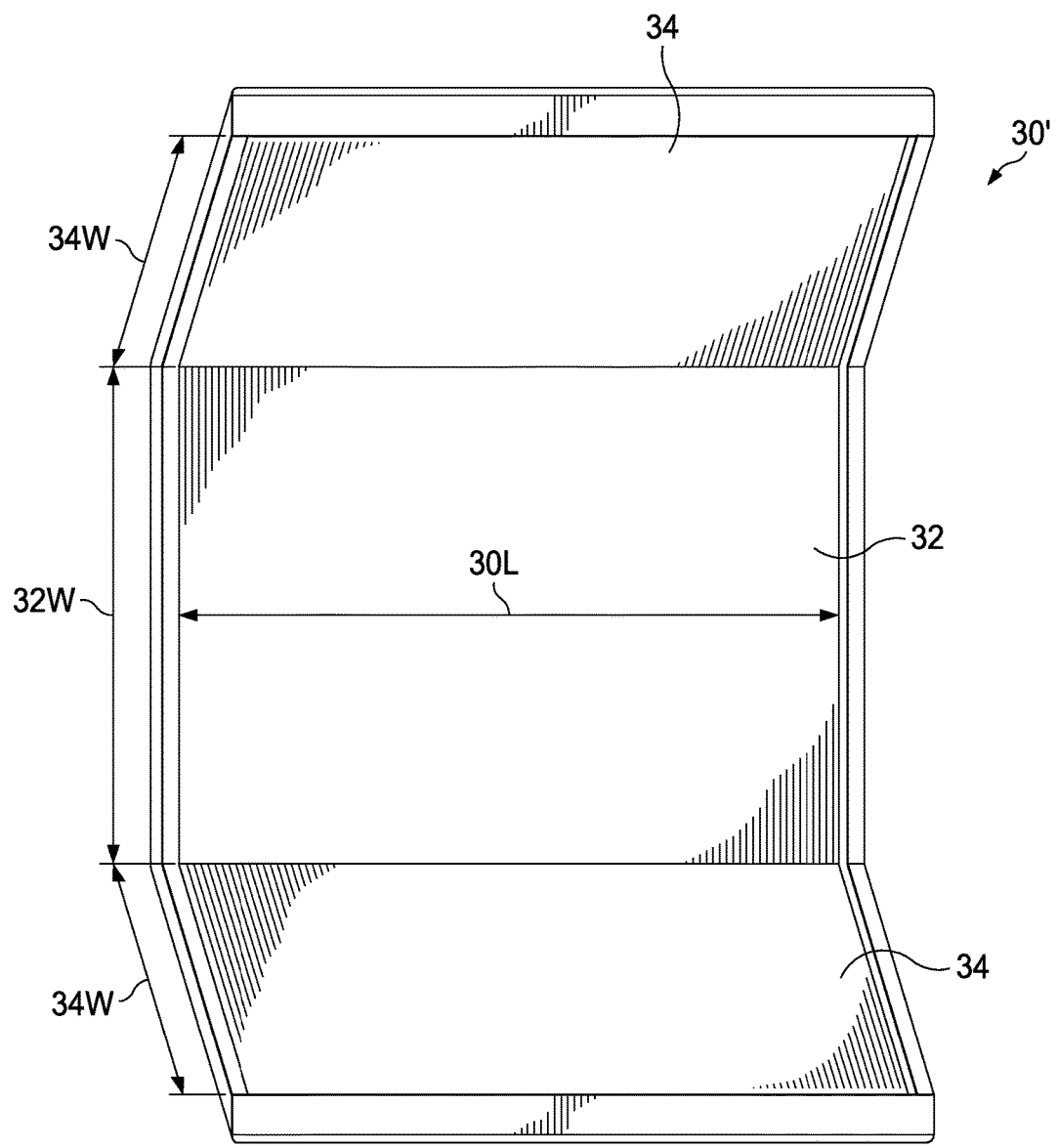
FIG. 3c is a perspective view of a compact mirror according to an embodiment of the present disclosure.

Cosmetic mirror 30 of this embodiment may be constructed of a size suitable for home use, similar to that described above relative to FIGS. 1a through 1d. However, the provision of hinges 39a, 39b and the foldability of cosmetic mirror 30 of this embodiment is especially suited for a "travel size" model. As shown in FIG. 3c, an example of travel size cosmetic mirror 30' has a length 30L of on the order of 2⅛ inches, with width 32W of base mirror 312 and base panel 36 on the order of 1½ inches, and widths 34W of each side panel 38 and side mirror 34 on the order of ½ inch. Again, the sizes of panels 36, 38 of this foldable cosmetic mirror 30 may of course vary, depending on the desired implementation.

Figure 4A:
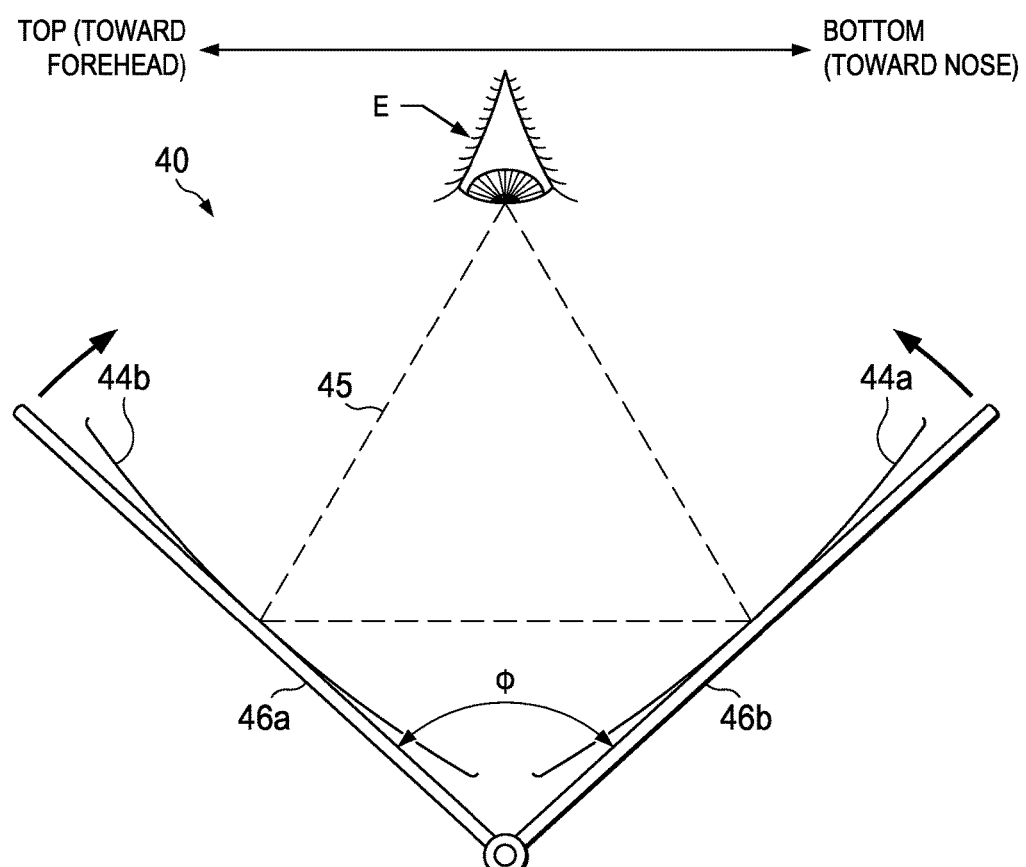
FIG. 4a is a schematic side view of the mirror surfaces of a compact cosmetic mirror according to another embodiment of the present disclosure.
Figure 4B:
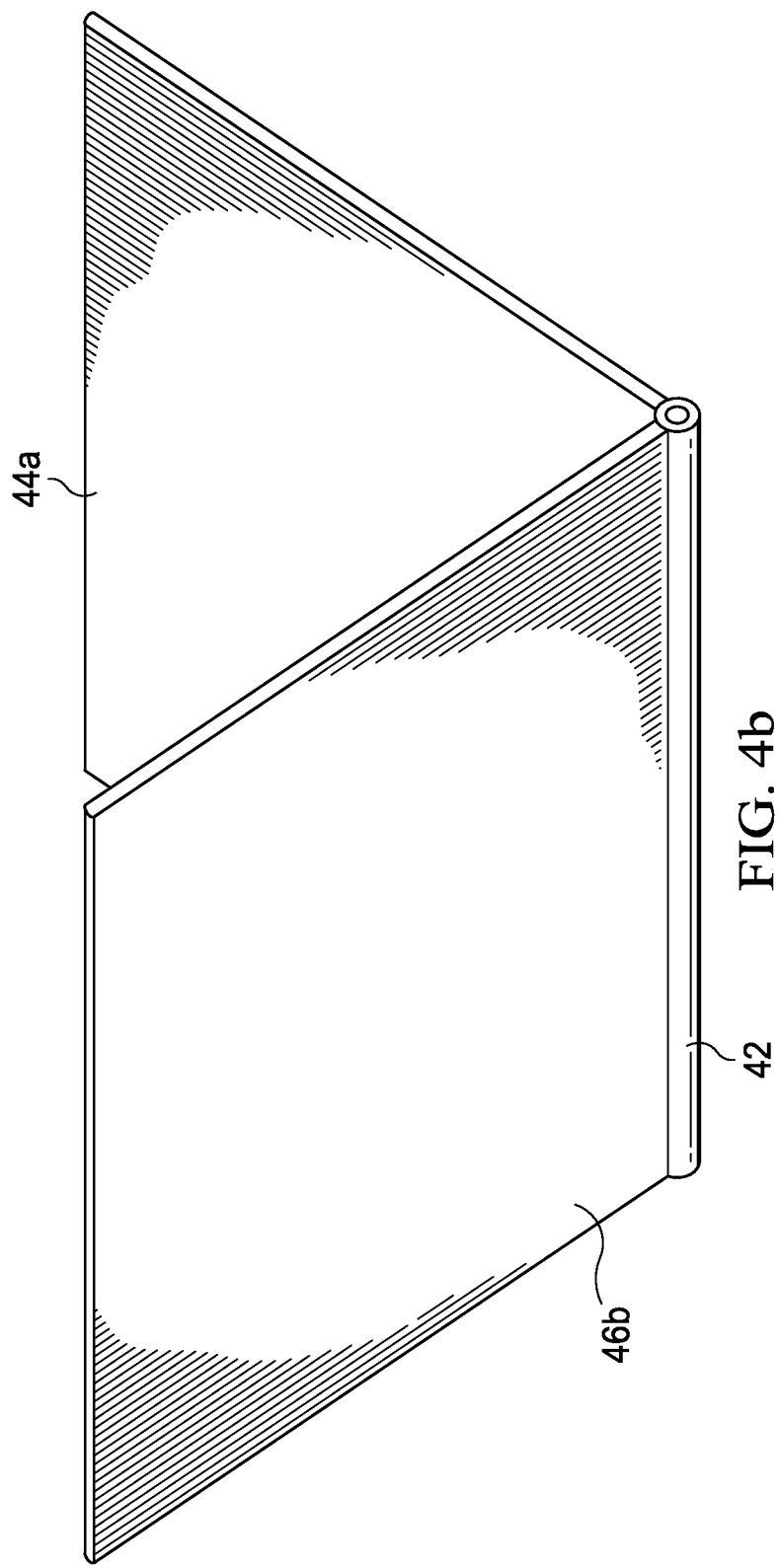

Referring now to FIGS. 4a and 4b, foldable cosmetic mirror 40 according to another embodiment will now be described, with reference to a schematic side view of mirror 40 in an open position. Cosmetic mirror 40 of this embodiment differs from the embodiment of FIGS. 3a through 3c by the absence of a base mirror and corresponding base panel. Rather, cosmetic mirror 40 in this embodiment is constructed to have two side panels 46a, 46b joined to one another along corresponding edges by linear hinge 42, as shown in FIG. 4b. Side panels 46a, 46b have concave mirrors 44a, 44b disposed on their facing sides; mirrors 44a, 44b may be constructed as mirrored concave surfaces of side panels 46a, 46b or may be mirrors that are attached to surfaces of side panels 46a, 46b, as discussed above. In this embodiment, hinge 42 allows side panels 46a, 46b to open and close upon one another (i.e., with mirrors 44a, 44b, shown in an exaggerated fashion in the schematic view of FIG. 4a, closed upon one another). Preferably, hinge 42 can lock so that each of concave mirrors 44a, 44b is at a preferred angle ϕ relative to one another, as shown in FIG. 4a for mirror 44b. In this embodiment, angle ϕ is the angle between the tangent lines to concave mirrors 44a, 44b at their respective vertices. This angle ϕ may be the maximum angle to which mirror 40 opens, or alternatively may be indicated by a detent or other mechanism for holding mirror 40 at that angle ϕ. It is contemplated that compact foldable mirror 40 will typically be handheld when used in the application of eye cosmetics.

According to this embodiment, mirrors 44a, 44b are constructed to have focal lengths (i.e., radii of curvature) that, in combination with angle ϕ, allow the user to place her eye E at the vertex of an equilateral triangle 45 such that she can see a magnified reflection of the top of her eyelid by focusing downward to lower-positioned side mirror 44a and a magnified reflection of the bottom of her eyelid by focusing upward to the upper-positioned side mirror 44b, without moving her head. In one example, mirrors 44a, 44b are constructed to have focal lengths that provide a magnification of about 5× for eye E at when open to an angle ϕ of about 60°, for the case in which points near the vertices of mirrors 44a, 44b are about a distance of about 3¾ inches from one another (i.e., the length of one side of equilateral triangle 45). Accordingly, it is contemplated that compact mirror 40 according to this embodiment will provide a convenient compact mirror that can significantly facilitate the application of eye cosmetics.

While one or more embodiments have been described in this specification, it is of course contemplated that modifications of, and alternatives to, these embodiments, such modifications and alternatives capable of obtaining one or more the advantages and benefits of the present disclosure, will be apparent to those of ordinary skill in the art having reference to this specification and its drawings. It is contemplated that such modifications and alternatives are within the scope of the present disclosure as subsequently claimed herein.

The invention claimed is:

1. A cosmetic mirror comprising:
a base mirror at a surface of a base panel having two long sides and two short sides; and
first and second side mirrors at surfaces of a first and a second side panel respectively, the first and the second side panels affixed to opposing parallel edges of the two long sides of the base panel,
wherein each of the first and second side mirrors is substantially concave, is positioned at an obtuse angle relative to the base mirror, has a greater than 1× magnification selected according to a width of the base panel between the first and second side panels and according to the angles of the first and second side mirrors relative to the base mirror, and has a radius of curvature oriented to provide a distance from each of the first and second side mirrors shorter than the focal length.

2. The cosmetic mirror of claim 1 wherein when the radius of curvature of each of the first and second side mirrors decreases, the angles of the first and second side mirrors increases so that a user's eye stays in front of the focal point of the first and second side mirrors.

3. The cosmetic mirror of claim 1 wherein the obtuse angle of each of the first and second side mirrors is equal.

4. The cosmetic mirror of claim 1 wherein the focal length of each of the first and second side mirrors produces a magnified upright virtual image of an object at a location corresponding to a vertex of an equilateral triangle between the first and second side mirrors having sides of a length corresponding to a distance between the first and second side mirrors.

5. The cosmetic mirror of claim 1 wherein the first and the second side panels are affixed to opposing parallel edges of the two long sides of the base panel through a first hinge and a second hinge, respectively.

6. The cosmetic mirror of claim 5 wherein the first and second hinges move the first and second side panels relative to one another between a closed position and an open position at a selected angle.

7. The cosmetic mirror of claim 6 wherein the selected angle is the maximum open position of the first and second hinges.

8. The cosmetic mirror of claim 5 wherein each of the first and second hinges has a detent at the selected angle.

9. The cosmetic mirror of claim 1 further comprising:
an adhering strip attached or attachable to a back surface of the base panel.

10. The cosmetic mirror of claim 1 wherein magnification of the base mirror differs from the magnification of the first and second side mirrors.

11. A cosmetic mirror comprising:
first and second side mirrors at surfaces of a first and a second side panel respectively, the first and the second side panels joined to one another along corresponding edges through a linear hinge,
wherein the first and second side mirrors are substantially concave, are positioned at an obtuse angle relative to one another, have a greater than 1× magnification selected according to the angles of the first and second side mirrors, and have a radius of curvature oriented to provide a distance from each of the first and second side mirrors shorter than the focal length.

12. The cosmetic mirror of claim 11 wherein the linear hinge locks at a maximum angle to which the cosmetic mirror opens.

13. The cosmetic mirror of claim 11 further comprising:
a detent which holds the linear hinge at a selected angle when the cosmetic mirror is open.

14. The cosmetic mirror of claim 11, wherein the first and second side mirrors have focal lengths that, in combination with the selected angle, allow a user's eye to be placed at the vertex of an equilateral triangle such that the user can see a magnified reflection of the top of the user's eyelid by focusing on the first or second side mirror without moving his/her head.

15. A cosmetic mirror comprising:
a base panel having two long sides, two short sides and a mirrored surface; and
first and second side panels affixed to opposing parallel edges of the two long sides of the base panel, each of the first and second side panels having a mirrored surface,
wherein the mirrored surface of each of the first and second side panels is substantially concave,
wherein each of the first and second side panels is positioned at an obtuse angle relative to the base panel,
wherein the mirrored surfaces of the first and second side panels have a greater than 1× magnification selected according to a width of the base panel between the first and second side panels and according to the angles of the first and second side panels relative to the base panel, and
wherein the mirrored surfaces of the first and second side panels have a radius of curvature oriented to provide a distance from the mirrored surfaces of each of the first and second side panels shorter than the focal length.

16. The cosmetic mirror of claim 15 wherein the mirrored surfaces of the base panel and the first and second side panels are mirrors attached to the base panel and the first and second side panels, respectively.

17. The cosmetic mirror of claim 15 wherein the mirrored surfaces of the first and second side panels have magnification at which a user can view the top eyelid and the bottom eyelid of the user's eye without moving his/her head.

18. The cosmetic mirror of claim 15 wherein the focal length of the mirrored surfaces of each of the first and second side panels produces a magnified upright virtual image of an object at a location corresponding to a vertex of an equilateral triangle between the mirrored surfaces of the first and second side panels having sides of a length corresponding to a distance between the first and second side panels.

19. The cosmetic mirror of claim 15 wherein the obtuse angle of the first side panel relative to the base panel is equal to the obtuse angle of the second side panel relative to the base panel.

20. The cosmetic mirror of claim 15 wherein the mirrored surface of the base panel is substantially concave.

* * * * *